United States Patent
Claussen

(10) Patent No.: US 7,299,069 B2
(45) Date of Patent: Nov. 20, 2007

(54) ADAPTING A COMMUNICATIONS NETWORK OF WIRELESS ACCESS NODES TO A CHANGING ENVIRONMENT

(75) Inventor: Holger Claussen, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 120 days.

(21) Appl. No.: 11/095,351

(22) Filed: Mar. 31, 2005

(65) Prior Publication Data
US 2006/0223546 A1 Oct. 5, 2006

(51) Int. Cl.
*H04B 1/38* (2006.01)
(52) U.S. Cl. ............... 455/561; 455/446; 455/550.1; 455/90.1; 455/90.3; 455/456.1; 455/456.5
(58) Field of Classification Search ............. 455/436, 455/437, 438, 439, 440, 441, 442, 443, 444, 455/445, 446, 453, 456.1, 456.2, 456.3, 456.4, 455/456.5, 456.6, 550.1, 561, 90.1, 90.2, 455/90.3, 418, 419, 420, 423, 424, 425
See application file for complete search history.

(56) References Cited

U.S. PATENT DOCUMENTS

| 5,463,673 | A | * | 10/1995 | Herscovici | 455/446 |
| 5,570,546 | A | * | 11/1996 | Butterworth et al. | 52/111 |
| 5,787,350 | A | * | 7/1998 | van der Vorm et al. | 455/446 |
| 5,974,322 | A | * | 10/1999 | Carlsson et al. | 455/446 |
| 6,134,422 | A | * | 10/2000 | Bobadilla et al. | 455/561 |
| 6,785,511 | B1 | * | 8/2004 | Hengeveld et al. | 455/16 |
| 7,099,669 | B2 | * | 8/2006 | Sheffield | 455/446 |
| 7,221,904 | B1 | * | 5/2007 | Gavrilovich | 455/11.1 |
| 2002/0025779 | A1 | | 2/2002 | Knight et al. | 455/11.1 |

(Continued)

FOREIGN PATENT DOCUMENTS

EP 0431956 6/1991

(Continued)

OTHER PUBLICATIONS

International Search Report PCT/US06/009393 dated Jul. 25, 2006.

(Continued)

*Primary Examiner*—Joseph Feild
*Assistant Examiner*—Olumide Ajibade-Akonai

(57) ABSTRACT

The present invention provides a method and an apparatus for adapting a communications network of a plurality of wireless access nodes, such as base stations to a changing environment. The method comprises determining a current location of at least a first user in the communications network, identifying a need for change in at least one parameter associated with a position of a first base station of the plurality of base stations based on the current location of the first user, and implementing a first response in the communications network in response to the need for change for the first base station. In this way, a self-deploying wireless access network may autonomously reposition base stations in a changing environment of user distributions across a coverage area and/or user demand by users of wireless communication devices, such as mobile units. Using indirect communication between the base stations capable of operating with different standards or protocols, a distributed algorithm may adapt the network to the changing environment. Such adaptation of the network in a distributed manner may control overall network costs of providing wireless services to mobile users.

20 Claims, 11 Drawing Sheets

U.S. PATENT DOCUMENTS

2004/0029617 A1* 2/2004 Flynn .................. 455/561

FOREIGN PATENT DOCUMENTS

| EP | 1357766 | 10/2003 |
|---|---|---|
| EP | 1398985 | 3/2004 |
| WO | 01/41486 | 6/2001 |

OTHER PUBLICATIONS

"Correlation Model for Shadow Fading in Mobile Radio Systems,"—Electronic Letters, By M. Gudmundson, Nov. 7, 1991, vol. 27, No. 23.

"A Mathematical Theory of Communication,"—by C. E. Shannon, Jul., Oct. 1948, The Bell System Technical Journal, vol. 27, pp. 379-423, 623-656.

* cited by examiner

ADAPTING A COMMUNICATIONS NETWORK OF WIRELESS ACCESS NODES TO A CHANGING ENVIRONMENT

FIELD OF THE INVENTION

This invention relates generally to telecommunications, and more particularly, to wireless communications.

DESCRIPTION OF THE RELATED ART

Wireless access networks are generally deployed by network operators or service providers to provide a variety of media services including data and voice wireless services to users of wireless communication devices. Examples of wireless communication devices include mobile units or terminals that use a wireless access network. Examples of wireless access networks include a global system for mobile communications system (GSM), a universal mobile telecommunications system (UMTS), a code division multiple access (CDMA) cellular communications system, a wide local area network (WLAN), and the like, which provide transport for data, voice, video or other services.

To provide media services to wireless or mobile users, a communications system typically comprises one or more wireless access nodes, such as base stations (sometimes referred to as node-Bs). A user of a mobile unit may exchange voice and/or data information with a wireless access node, e.g., a base station over an air interface. To transmit the voice and/or data information, the base station or mobile unit encodes the information according to one or more wireless telecommunication protocols such as a UMTS, GSM, CDMA protocol, and the like. The encoded information is then modulated as an electromagnetic wave to generate a radio frequency (RF) signal that is transmitted across the air interface.

As desire for new feature-rich wireless services and traffic demands goes up, complexity in the management, deployment, and configuration of wireless access networks often increases. With changes in services and traffic, adaptation of a network becomes inevitable to a constantly changing environment. However, due to centralization of control, hierarchical nature of architecture and isolation from other systems, most wireless access networks may be too inflexible as far as adapting to new wireless services and traffic demands goes. As the communication systems become richer in features and capability, the isolation between systems will have to decrease since the need for rapidly deployable communications systems in areas of high-traffic density will increase.

Accordingly, one issue that service providers or network operators of many communications systems may inevitably face is the increase in cost for deployment and operation of wireless access networks. For example, to increase the capacity of wireless access networks, a trend to smaller cell sizes (with a commensurate increase in the total number of cells) is clearly emerging. In combination with the additional requirement of interoperability of heterogeneous systems, the deployment and configuration of wireless access networks represents an increasing cost factor.

To control these costs, a deployment process based on self-configuration of wireless access nodes is used to adapt a network to its changing environment involving changes in number, position and configuration of its wireless access nodes, user demand and location of users. Such a self-deploying network may optimize the use of the wireless access nodes. In contrast to traditional ad-hoc networks, where the configuration is optimised for the current locations of the nodes, a self-deploying network has the freedom to choose the locations of its nodes autonomously. Therefore, a self-deploying network with mobile base stations is able to adapt to changes in user distributions across the coverage area and user demand, resulting in an improved performance compared to conventional networks For cellular networks, a planning process is usually performed in a quasi-manual manner, using a mixture of centralised planning tools, expensive drive testing and economic rules-of-thumb. For other wireless networks, such as wireless local area networks (WLAN), no planning is performed at all, resulting in low performance and efficiency. Likewise, statically deployed networks with centralised control are unable to recover reliably from failing nodes. In this way, some significant drawbacks of network adaptation solutions are expense, time consumption and complicated cellular planning process.

Use of a host of techniques, such as simulated annealing, evolutionary algorithms, integer linear programming, and greedy algorithms has been proposed to position wireless access nodes, e.g., base stations for network planning. Other approaches have explored the trade-offs between coverage, cell count and capacity. It has been shown that, the identification of the globally optimum base station locations in a network of multiple base stations is a NP-hard problem, far too complex to solve computationally. Further difficulties are that most of the system parameters required to find an optimal solution are unknown, and the optimal positions change constantly due to the changes in user demand, user positions, and base station positions.

More specifically, the manual adaptation of the base station positions based on the optimal positions identified by the network relies on manual decision making and optimization. Such manual decision making and optimization may become exorbitantly expensive, essentially dominating the total network costs, particularly as the capital expenses continue to reduce over time through improvements in hardware and software. Even worse, a large-scale increase in the sheer complexity of a wireless access network deployment and configuration process may exceed the capabilities of manual planning and configuration entirely.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for adapting a communications network of a plurality of base stations to a changing environment. The method comprises determining the current locations of a plurality of users in the communications network connected to a first base station, identifying a need for change in at least one parameter associated with a position of the first base station of the plurality of base stations based on the current locations of the connected users, and implementing a first response in the communications network in response to the need for change for the first base station.

In another embodiment, a wireless access node associated with a communications network comprises a controller capable of adapting the communications network to a changing environment and a storage coupled to the controller. The storage stores instructions to determine a current location of a plurality of users in the communications network, identify a need for change in at least one parameter associated with a position of the wireless access node based on the current location of the users, and implement a first response in the communications network in response to the need for change for the wireless access node.

In yet another embodiment, a communications system comprises a wireless access node associated with a communications network. The wireless access node includes a controller capable of adapting the communications network to a changing environment and a storage coupled to the controller. The storage may store instructions to determine a current location of a plurality of users in the communications network, identify a need for change in at least one parameter associated with a position of the wireless access node based on the current location of the users, and implement a first response in the communications network in response to the need for change for the wireless access node.

In still another embodiment, an article comprising a computer readable storage medium storing instructions that, when executed cause a communications system to determine a current location of a plurality of users in a communications network to adapt the communications network of a plurality of base stations to a changing environment, identify a need for change in at least one parameter associated with a position of a first base station of the plurality of base stations based on the current location of the users, and implement a first response in the communications network in response to the need for change for the first base station.

BRIEF DESCRIPTION OF THE DRAWINGS

The invention may be understood by reference to the following description taken in conjunction with the accompanying drawings, in which like reference numerals identify like elements, and in which.

Figure 1:
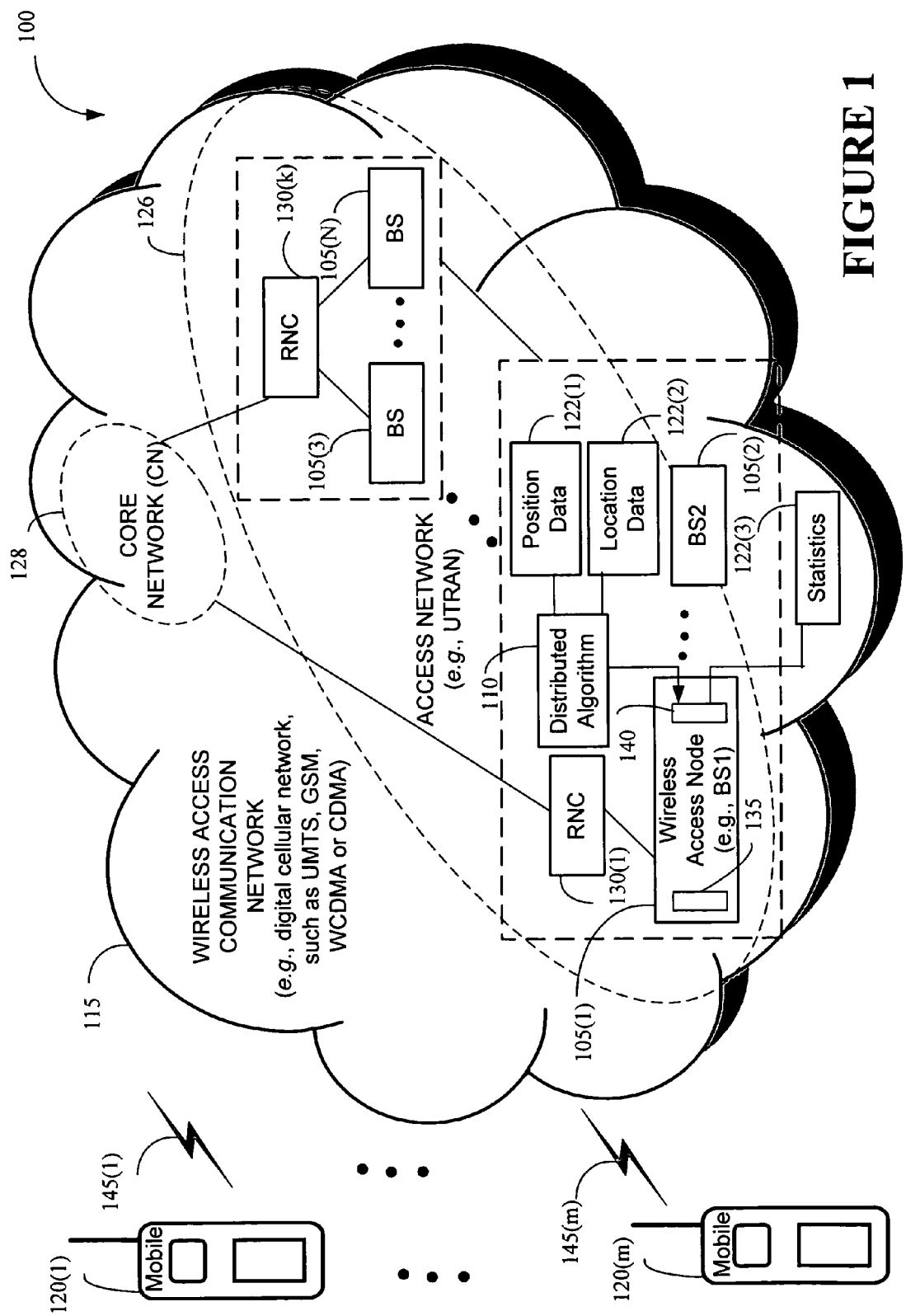
FIG. 1 illustrates a communications system including a wireless access node, e.g., base station and at least one neighboring wireless access node that stores a distributed algorithm to adapt a wireless access network to a changing environment for a user associated with a wireless communication device, e.g., mobile unit capable of communicating with the wireless access node according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a communications system and a method is provided for adapting a network of a plurality of wireless access nodes to a changing environment. For example, a wireless access network, i.e., self-deploying network uses self-configuration of one or more wireless access nodes, e.g., base stations to control overall network costs of providing a service to a user of a wireless communication device, such as a mobile unit. Specifically, one or more wireless access nodes may modify positions thereof without a human interaction to enable a wireless access network to adapt autonomously to changes in user locations and/or user demand. For wireless access node or base-station positioning in a wireless access network, an algorithm provides autonomous self-deployment and self-configuration, based on a changing environment of user locations and user demand (current values or statistics), in a distributed manner. A distributed algorithm provides distributed processing resulting in a self-organising manner to achieve a desired level of robustness and scalability. Indirect communication between the wireless access nodes, e.g., base stations performing self-deployment, enables a technology independent adaptation of the wireless access network. Accordingly, the wireless access network may comprise base stations capable of operating with different standards or protocols, such as UMTS or 802.11, complementing each other.

Referring to FIG. 1, a communications system 100 is illustrated to include a plurality of wireless access nodes, e.g., base stations (BS) 105 (1-N) according to one illustrative embodiment of the present invention. For example, a first wireless access node or a first base station 105(1) may have at least one neighboring, e.g., a second wireless access node or a second base station 105(2). The first wireless access node or the first BS 105(1) may store a distributed algorithm 110 to adapt a wireless access communication network 115 to a changing environment for at least a first user associated with a first wireless communication device, e.g., a first mobile unit 120(1). The first wireless communication device or first mobile unit 120(1) may be capable of communicating with the plurality of wireless access nodes or the BSs 105 (1-N).

One example of the wireless access communication network 115 is a self-deploying radio access network. Such a self-deploying radio access network may learn from a current performance, i.e., in terms of coverage and capacity and in terms of the network profitability. Accordingly, the wireless access communication network 115 may determine desired changes in positions, additions, and removals of one or more wireless access nodes or the BSs 105 (1-N) based on user demands, user locations and/or distribution of users in an environment that may change over time.

Consistent with one embodiment, the distributed algorithm 110 may adapt the wireless access communication network 115 to the changing environment based on position data 122(1) and location data 122(2) and/or statistics 122(3) associated with the changing environment. By optimizing the first wireless access node or the first BS 105(1) based on position data 122(1) and location data 122(2) and/or statistics 122(3) associated with the changing environment, the distributed algorithm 110 may adapt the wireless access communication network 115 to the changing environment. That is, in one embodiment, each wireless access node or the BS 105 may use a corresponding distributed algorithm 110 to adapt the wireless access communication network 115 by all the wireless access nodes or the BSs 105 (1-N) in a distributed manner.

In one embodiment, a changing environment behavior of the wireless access communication network 115 may be collected as the position data 122(1) associated with positioning and re-positioning of the wireless access nodes or the BSs 105 (1-N) and the location data 122(2) associated with current locations of users of the plurality wireless communication device, e.g., mobile units 120(1-m). Additionally, the statistics 122(3) may be collected as one or more user statistics at each wireless access node or base station 105 during operation thereof.

For example, in one embodiment of the present invention, the position data 122(1) may comprise coordinates data for a particular position of at least a first wireless access node or the BS 105 (1) within a coverage area of the wireless access communication network 115. Likewise, the location data 122(2) may comprise current location data of the first user associated with the first wireless communication device or the first mobile unit 120(1). The statistics 122(3) may comprise, for example, demand for use from users for the wireless access communication network 115 over a period of time, such as requests for particular data rates.

The wireless access communication network 115 may comprise a conventional radio access network 126, e.g., a Universal Terrestrial Radio Access Network (UTRAN) and a conventional core network (CN) 128. The wireless access communication network 115 may further comprise a first and a second radio network controller (RNC) 130(1), 130(k) to manage communications with the plurality of wireless communication devices or the mobile units 120(1-m) according to one illustrative embodiment of the present invention.

Each of the first and second RNCs 130(1), 130(k) may be associated with one or more wireless access nodes or the BSs 105(1-N), such as Node-Bs within the wireless access communication network 115. Specifically, the first RNC 130 (1) may be coupled to a first plurality of wireless access nodes or base stations, i.e., Node-Bs including the first wireless access node or the first BS 105(1) and a second wireless access node or a second BS 105(2). Likewise, the second RNC 130(k) may be coupled to a second plurality of wireless access nodes or base stations, i.e., Node-Bs 105(3-N).

The first wireless access node or the first BS 105(1) may comprise a controller 135 capable of adapting the wireless access communication network 115 to the changing environment, in one embodiment. The first wireless access node or the first BS 105(1) may further comprise a storage 140 coupled to the controller 135. The storage 140 may store instructions, i.e., the distributed algorithm 110 to determine a current location of a plurality of users in the wireless access communication network 115. The distributed algorithm 110 may identify a need for change in at least one parameter associated with a position of the first wireless access node or the first BS 105(1) based on the current location of the users. In response to the need for change for first wireless access node or the first BS 105(1), the distributed algorithm 110 may implement a first response in the wireless access communication network 115.

Using the distributed algorithm 110 at each wireless access node or the BS 105(1-N), the wireless access communication network 115 may autonomously identify a need for change in at least one parameter associated with at least one of a number, position and configuration of a wireless access node or base station 105, based on user demand and user locations, adapting the wireless access communication network 115 to the changing environment. By using the distributed algorithm 110, the wireless access communication network 115 may obtain a near-optimum solution for self-deployment and self-configuration, based only on limited locally available system knowledge. While the self-deployment may refer to adapting to changes in a wireless or mobile communication environment involving the users of the plurality wireless communication device or mobile units 120(1-m) and the wireless access nodes or base stations 105(1-N) within the wireless access communication network 115 over a relatively long term, such as weeks to years, the self-configuration may refer to the adaptation for a relatively short-term activity over tens of minutes to days, as examples.

In one embodiment, a short term self-deployment is possible, for example, in a military environment, where the wireless access nodes or base stations 105(1-N) may be mobile (e.g., flying drones, or autonomous vehicles). For this case, the current mobile unit 120 locations may be taken into account instead of collected statistics 122(3) by the distributed algorithms 110.

Instead of optimizing the wireless access node or base station 105 positions according to cell coverage or cell capacity, the distributed algorithm 110 may optimize the wireless access node or base station 105 positions based on the changing environment, such as the current, and constantly changing, wireless communication device or mobile unit connections 145(1-$m$), user demand, and user locations and/or wireless access node or base station 105 positions. In the communications system 100, the wireless access node or base station 105 positions may be visible and/or dependent on wireless communication device or mobile unit 120 locations. When the current mobile unit 120 locations and/or requests of data rates from users change, one or more of the wireless access nodes or base stations 105(1-N) may move to a new position. In this manner, the distributed algorithm 110 may optimize the wireless access node or base station 105 positions without utilizing knowledge of noise and interference.

One example of the wireless access communication network 115 includes a digital cellular network, such as defined at least in part by the UMTS, GSM, WCDMA or CDMA standards. More specifically, the 3rd Generation Partnership Project (3GPP) specifications may define interactions between the plurality of wireless communication devices, e.g., mobile units 120(1-$m$) and the first and second plurality of the wireless access nodes or base stations, i.e., Node-Bs 105(1-N) within the communications system 100, such as a based on a CDMA technique. The wireless communication device or the mobile unit 120 may refer to a host of wireless communication devices including, but not limited to, cellular telephones, personal digital assistants (PDAs), and global positioning systems (GPS) that employ the communications system 100 to operate in the wireless access communication network 115, such as a third or fourth generation digital cellular CDMA or WCDMA network.

In one embodiment, the distributed algorithm 110 may be used with the changing environment based on user distribution and demand maps. For example, a network operator may obtain the user distribution and demand maps from a service broker agent. In another embodiment, such optimization may be used to determine an optimum radiation pattern for each wireless access node or base station 105 instead of, or complementary with the wireless access node or base station 105 positioning. Since a radiation pattern of a wireless access node or base station 105 influences a desired transmit power in a manner similar to the wireless access node or base station 105 position, the radiation pattern may be optimized. In this case, for each wireless access node or base station 105 a globally or locally optimal or near optimal radiation pattern may be identified in the wireless access communication network 115.

Figure 2:
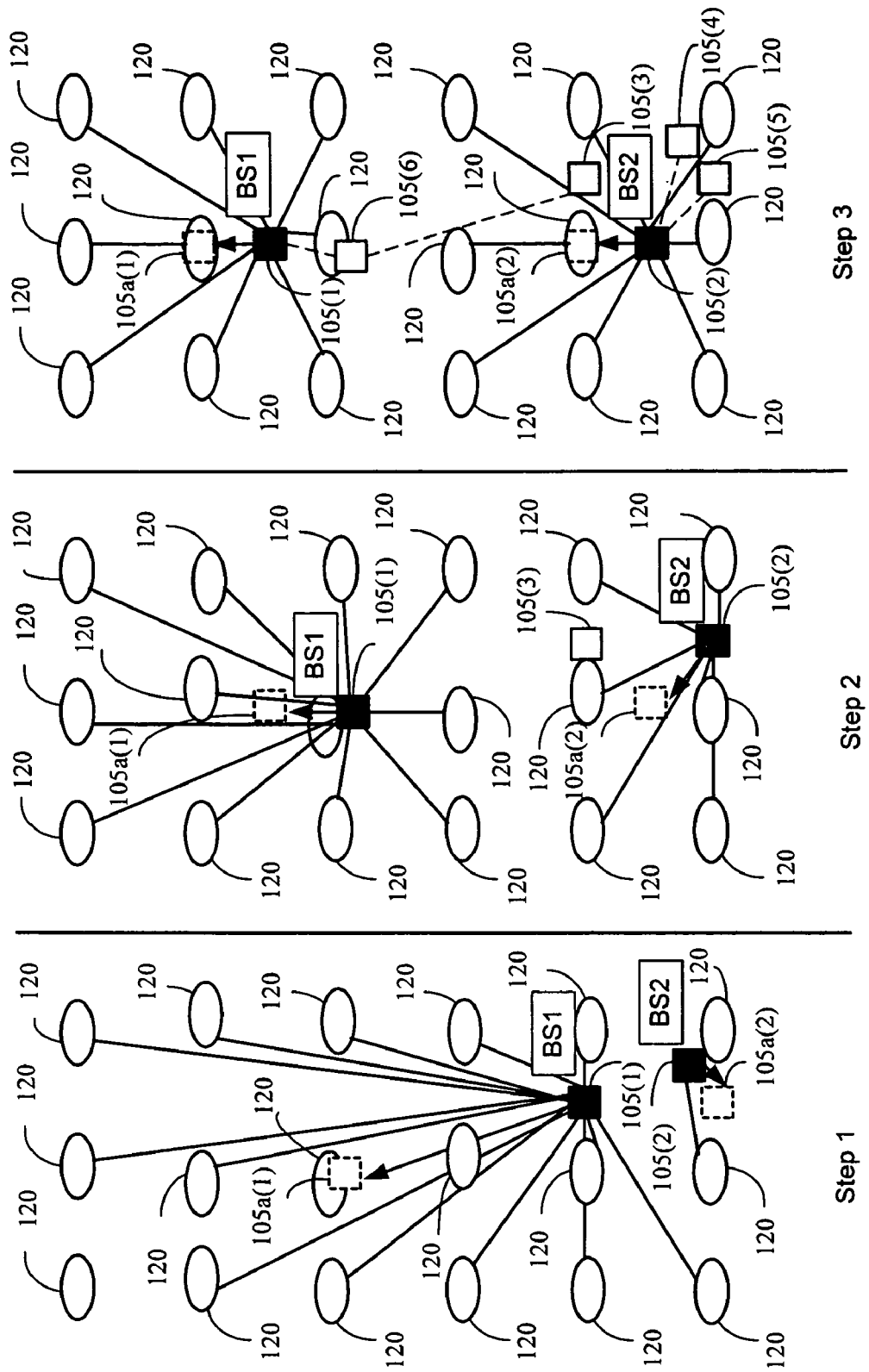
FIG. 2 schematically depicts self-deployment of the wireless access network illustrated in FIG. 1 based on self-organization using indirect communication between a plurality of wireless access nodes or base stations and local optimization of each wireless access node or base station in accordance with an exemplary embodiment of the instant invention.

Turning now to FIG. 2, self-deployment of the wireless access communication network 115 illustrated in FIG. 1 is schematically depicted based on self-organization using indirect communication between the plurality of wireless access nodes or base stations 105(1-N) and local optimization of each wireless access node or base station 105 in accordance with an exemplary embodiment of the instant invention. An example of a self-organisation process, resulting from such indirect communication between wireless access nodes or base stations 105 and local optimization of each wireless access node or base station 105 location is illustrated in FIG. 2. The first and second wireless access nodes or base stations BS1, BS2 are shown as solid squares 105(1-2) and the wireless communication devices or mobile units 120 are shown as ellipses with a line to the connected wireless access node or base station 105. The optimal base station positions are shown as dotted squares 105$a$(1) and 105$a$(2).

By using the indirect communication, each wireless access nodes or base stations 105 may modify its surrounding environment as a first response to the need for change determined by the distributed algorithm 110, and these changes then influence the behaviour of neighbouring wireless access nodes or base stations 105 as a second response. In the wireless access communication network 115, for example, interactions known as stigmergy may be used to coordinate activities of the wireless access nodes or base stations 105(1-N) by means of self-organization.

In a wireless communication, the environment in the wireless access communication network 115 may relate to the link connections 145(1-$m$) to the wireless communication devices or mobile units 120(1-$m$). When one or more of the wireless communication devices or mobile units 120(1-$m$) connect to a particular wireless access node or base station 105 with a strongest received pilot power, the link connections 145(1-$m$) may provide information on the coverage of neighbouring cells associated with neighbouring wireless access nodes or base stations 105.

To adapt to a change in the network environment, the distributed algorithm 110 may perform local optimization of the wireless access node or base station 105 positions. Other optimization possibilities include, for example, modifications of the pilot powers to achieve load balancing (e.g., either equal transmit power, or equal capacity) in each cell. The indirect communication through modification of the network environment may allow interoperability of heterogeneous systems (i.e., systems with different access technologies) since the first wireless access node or base station 105(1) may not directly exchange data with the second wireless access node or base station 105(2) in the wireless access communication network 115.

In a start condition, as step 1, the wireless communication devices or mobile units 120 are connected to either the first wireless access node or base station 105(1) or the second wireless access node or base station 105(2) based on a connection rule (e.g., strongest received pilot power). This scenario defines the current network environment in one embodiment. In each step, the distributed algorithm 110 calculates the optimal positions for wireless access nodes or base stations 105 based on the current network environment. At step 2, the first and second wireless access nodes or base stations 105(1-2) may move to the predicted optimum positions, as shown by the dotted squares 105$a$(1) and 105$a$(2). The new base station positions 105$a$(1) and 105$a$(2) may trigger a change in the link connection 145(1-$m$) to the wireless communication devices or mobile units 120(1-$m$). This modification of the network environment provides an indirect way of communication between the wireless access nodes or base stations 105, e.g., providing information on coverage, positions, and the like.

Figure 3:
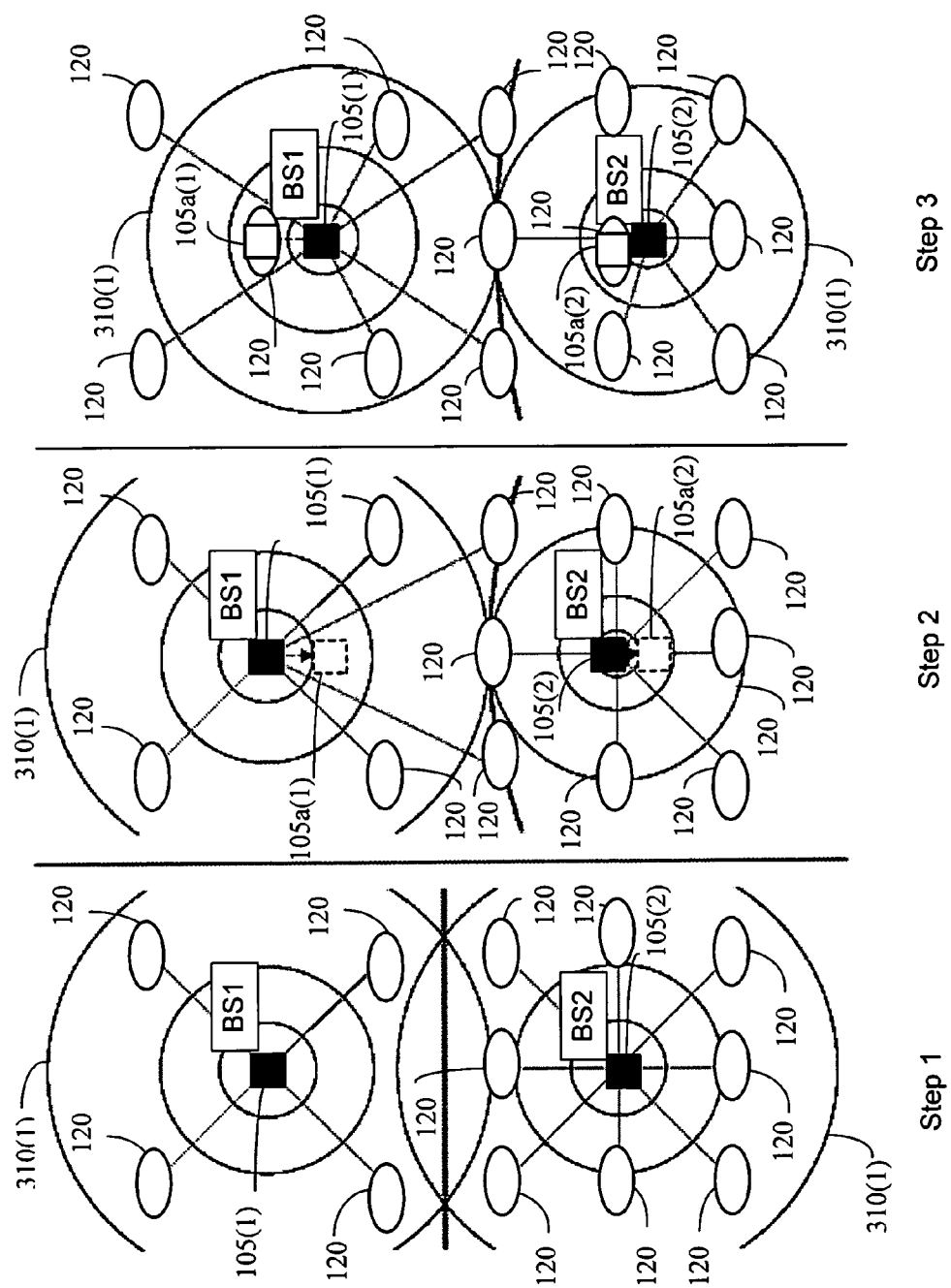
FIG. 3 schematically depicts re-positioning of the plurality of wireless access nodes or base stations shown in FIG. 2 consistent with one embodiment of the present invention.

Referring to FIG. 3, re-positioning of the first and second wireless access nodes or base stations 105(1-2) shown in FIG. 2 is schematically depicted consistent with one embodiment of the present invention. That is, a further example showing the self-deployment process triggered by load balancing via modification of the pilot powers is shown in FIG. 3. A set of contour plots 310(1) illustrate the received pilot power.

Besides the optimization of the resource efficiency, the optimal positions 105a(1) and 105a(2) of the first and second wireless access nodes or base stations 105(1-2), respectfully, may depend on a variety of factors or constrains, such as suitable locations, costs, or legislations may play a role for the positioning. For example, the optimal positions 105a(1) and 105a(2) may depend upon use of resources (i.e. transmit power and available frequency spectrum), within constrains such as maximum transmit power levels of single base stations or possible locations.

Accordingly, consistent with one embodiment, rules for optimal positioning of individual wireless access nodes or base stations, and wireless access nodes or base stations 105 in the wireless access communication network 115 may be stated as follows: (1). a local optimization of individual wireless access nodes or base stations may provide an optimal position for an individual wireless access node or base station that enables sustaining all requested connections with a given minimum possible transmit power criteria and (2). a global optimization of wireless access nodes or base stations 115 in the wireless access communication network 115 may provide the optimal positions of all the wireless access communication network 115 in a network, enabling the network to sustain all requested connections with a given minimum possible transmit power criteria. In addition, both rules may be subject to desired constraints. Of course, a locally optimum position of a single base station of Rule 1 may not necessarily be equivalent to a position of the same base station in a globally optimized network based on Rule 2.

Figure 4:
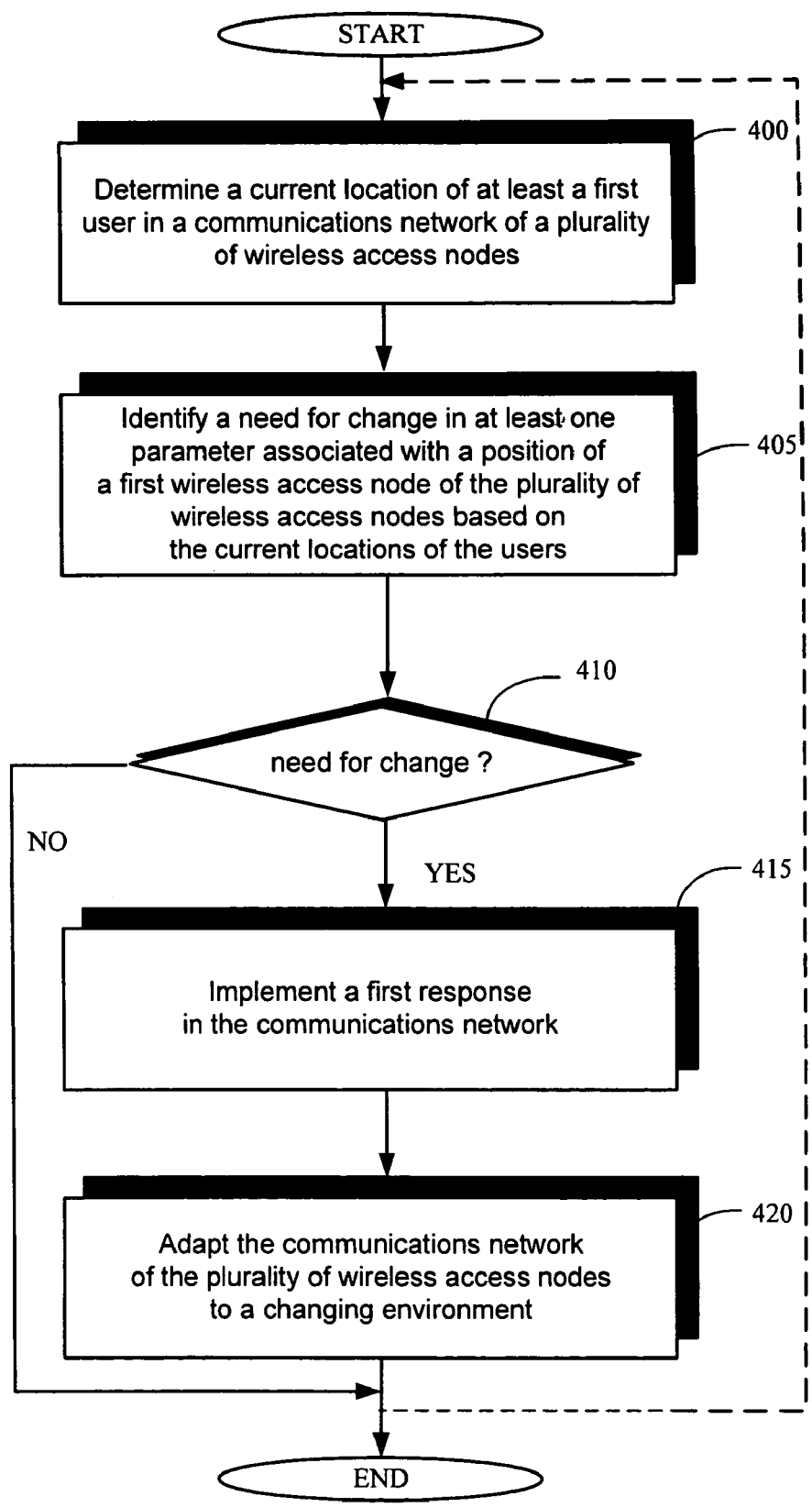
FIG. 4 illustrates a stylized representation of a flow chart implementing a method for adapting the wireless access network illustrated in FIG. 1 of the plurality of wireless access nodes or base stations shown in FIG. 2 to a changing environment consistent with one embodiment of the present invention.

As shown, FIG. 4 illustrates a stylized representation of a flow chart implementing a method for adapting the wireless access communication network 115, illustrated in FIG. 1, of the plurality of wireless access nodes or base stations 105(1-N) shown in FIG. 2 to a changing environment consistent with one embodiment of the present invention. At block 400, the distributed algorithm 110 stored in the storage 140 may be executed by the controller 135 at the wireless access node or base stations 105(1) to determine a current location of at least one first user in a communications network, i.e., the wireless access communication network 115 of the plurality of wireless access nodes or base stations 105(1-N).

The distributed algorithm 110 may identify a need for change in at least one parameter associated with a position of the first wireless access node or the first BS 105(1) based on the current location of the users, as indicated in block 405. A decision block 410 may ascertain whether a need for change in the current position of the first wireless access node or the first BS 105(1) exists. If so, at block 415, the distributed algorithm 110 may implement a first response in the wireless access communication network 115 by moving or re-positioning the first wireless access node or the first BS 105(1) to a new position, such as an optimal position. In this way, the distributed algorithm 110 may adapt the wireless access communication network 115 to a changing environment, as shown in block 420, according to some embodiments of the instant invention.

Figure 5:
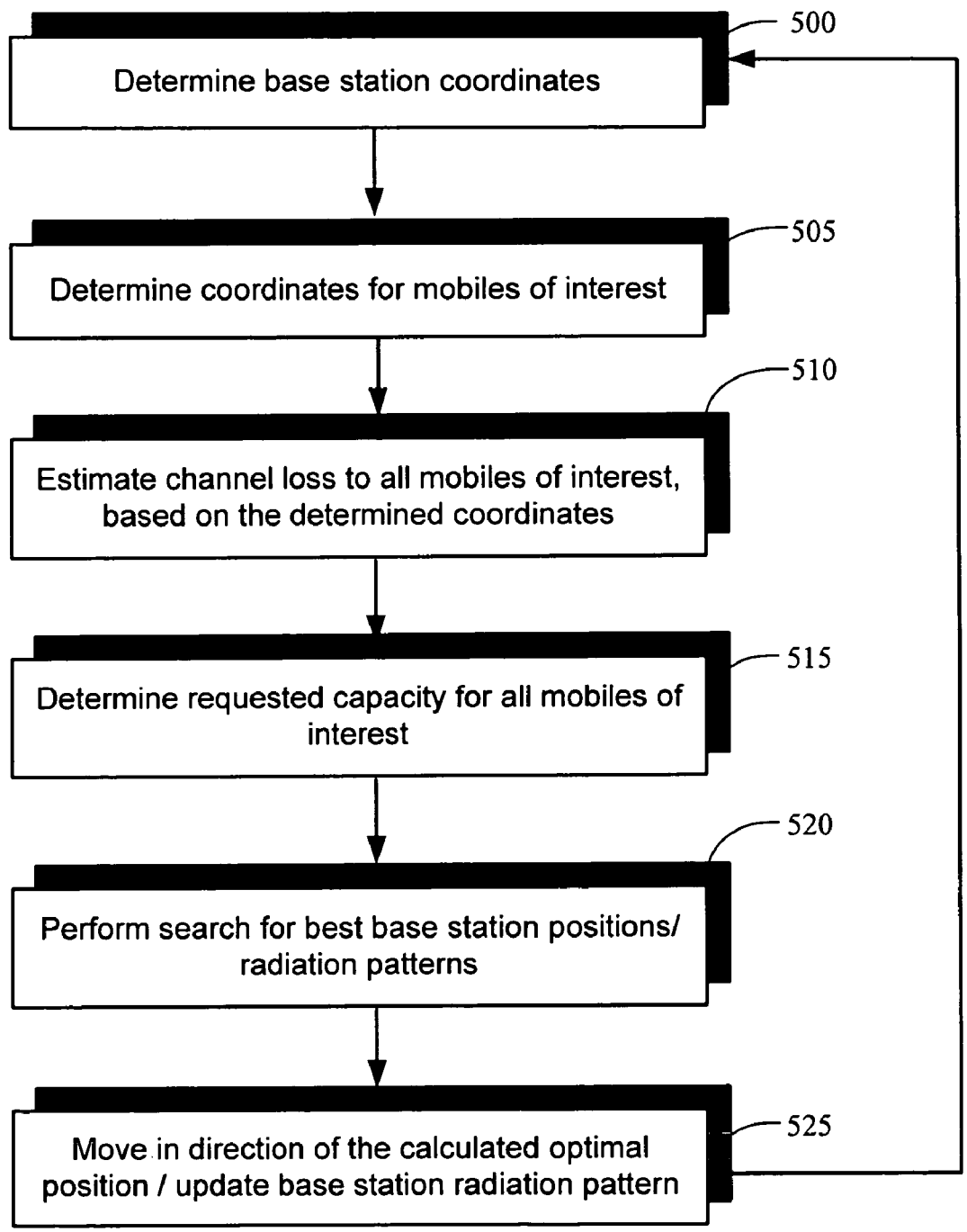
FIG. 5 illustrates an optimization process for a wireless access node or base station shown in FIG. 2 based on the position data and the location data and/or statistics associated with the changing environment to adapt the wireless access network illustrated in FIG. 1 consistent with one embodiment of the present invention.

Consistent with one embodiment of the present invention, in FIG. 5, an optimization process for the first and second BSs 105(1-2) shown in FIG. 2 is illustrated based on the position data 122(1) and the location data 122(2) and/or statistics 122(3) associated with the changing environment to adapt the wireless access communication network 115 illustrated in FIG. 1. Using the distributed algorithm 110, at the first and second BSs 105(1-2), the wireless access communication network 115 may determine base station coordinates for the current positions thereof, at block 500. Likewise, coordinates for the wireless communication devices or mobile units 120 of interest that may depend upon a particular application or service, for example, may be determined at block 505 to obtain the current locations of the associated users.

Based on the determined coordinates, at block 510, channel loss to the plurality of the wireless communication devices or mobile units 120(1-m), e.g., all the mobiles wireless communication devices or mobile units 120 of interest may be estimated. The requested capacity for the plurality of the wireless communication devices or mobile units 120(1-m) of interest may be determined at block 515. A search may be performed for ideally given best base station positions and/or radiation patterns for the first and second BSs 105(1-2), at block 520. In this manner, the distributed algorithm 110, at block 525, may cause a move in direction of a calculated optimal position and/or updated base station radiation pattern for the first and second BSs 105(1-2).

To satisfy a given minimum possible transmit power criterion for an arbitrary small bit-error rate, a capacity limit may be targeted as optimisation for the wireless access communication network 115, in some embodiments. For simplicity of capacity equations, the interference from other base stations 105 or mobile units 120 may be modelled as a white Gaussian random variable with zero mean. In addition, only the slow fading components of the channel may be taken into account for the base station 105 positioning.

A minimum power requirement for a link with given capacity may be obtained in a manner set forth below, for example. The channel capacity C for a channel perturbed by additive white Gaussian noise is a function of the average received signal power $S=E\{s(t)s(t)^*\}$, the average noise power $N=E\{n(t)n(t)^*\}$ and the bandwidth B, where s(t) and n(t) denote the signal and noise values at the time instant t. The well known capacity relationship (Shannon-Hartley theorem) may be expressed as $$C = B\log_2\left(1 + \frac{S}{N}\right). \qquad (1)$$

To write (1) in terms of transmitted power $S_{tx}$, the impact of the channel loss $L=L_p+L_s$, characterised as a combination of attenuations resulting from path loss $L_p$ and shadow fading $L_s$ is taken into account. However, this requires knowledge of the positions of the connected mobile units 120 and knowledge of the environment (i.e. shadow fading properties). Then, the channel capacity may be rewritten as $$C = B\log_2\left(1 + \frac{S_{tx}}{NL}\right). \qquad (2)$$

Finally, the minimum required transmit power for a radio link of capacity C for given values of bandwidth B, channel attenuation L and received noise N can be determined as $$S_{tx} = NL(2^{C/B}-1). \qquad (3)$$

In this equation, the capacity C is determined by the requested data rate and the bandwidth W of the radio link is known. Assuming operation at q dB from the capacity limit, $S_{tx}$ is additionally multiplied by the factor $10^{(q/10)}$.

For globally optimum positioning, i.e., for joint optimization of the wireless access communication network 115, the optimal positions of all base stations 105 may minimise the total transmitted power for all requested links (Rule 2). Assuming independent links 145 within each cell for both, uplink and downlink, an optimum set of coordinates for all M base stations 105 and all $K_m$ requested links to the mth base station 105 may be written as $$(x_{opt}, y_{opt}) = \arg\min_{(x,y)} \left\{ \sum_{m=1}^{M} \sum_{k=1}^{K_m} S_{tx}^{(k,m)}(x_m, y_m) \right\}, \quad (4)$$

where $(x, y) = (\{x_1 \ldots x_M\}, \{y_1 \ldots Y_M\})$ is the set of possible base station 105 position coordinates. The indices for the base station 105 and the link 145 are denoted by m and k, respectively. $S_{tx}^{(k,m)}(x_m, y_m)$ denotes the required transmit power from (3) for the kth link 145 of the mth base station 105 at the coordinates $(x_m, y_m)$ within the possible region of deployment.

Alternatively to using specific connections for the calculation of the required transmit power $S_{tx}^{(k,m)}(x,y)$, the above problem may be solved for a given user and demand distribution. Then, for each potential user location the expected value $E\{S_{tx}^{(k,m)}(x,y)\}$ may be used instead. The desired user statistics 122(3) may be collected by each base station 105 during operation, resulting in the average optimum position and may be used to optimize stationary the base stations 105.

The optimisation of (4) implies a search over a very large number of candidates, growing exponential with the number of base stations. Therefore, an exhaustive search for jointly optimal positions for more than a few base stations in a limited area is impractical due to prohibitive computational complexity (i.e. NP-hard problem). In addition, centralised processing is necessary and complete system knowledge is required. However, in reality most of the desired parameters (e.g. channels and interference at new positions) are unknown. Therefore, even if the computational complexity were manageable, it would still be difficult to compute the globally optimum positions due to incomplete of system knowledge.

For locally optimum positioning, i.e., for each individual mth base station 105, the position may be optimised locally, by searching for a position, which minimises its transmitted power for all $K_m$ requested links (Rule 1). Assuming independent links 145 within each cell for both, uplink and the downlink, the locally optimum coordinates of each mth base station 105 may be calculated as $$(x_{opt}, y_{opt}) = \arg\min_{(x_m, y_m)} \left\{ \sum_{k=1}^{K_m} S_{tx}^{(k,m)}(x_m, y_m) \right\}, \quad (5)$$

Again, the optimisation may be obtained for a given user and demand distribution instead of for specific connections by using the expected value of the transmit power, required at each potential user location. In contrast to the global optimisation, the local optimisation may be obtained in a de-centralised manner, based only on local system knowledge. However, as before, not all of the required system knowledge is available.

For positioning with limited system knowledge, the globally and/or locally optimal positioning of networks is a challenging task due to limited knowledge of the constantly changing system parameters and the prohibitive computational complexity. The locally optimum solution is of manageable computational complexity, but suffers from incomplete system knowledge. As a consequence, a solution based on partial system knowledge may provide results close to an optimum solution.

Current values for shadow fading and interference levels seen by each wireless access node 105 may be measured. However, when the base station 105 positions change relative to the interference sources, both, the shadow fading values and also the interference, may change unpredictably. Therefore, the shadow fading values $L_s$, and the interference levels, which dominates N in (3), at any new potential base station 105 position may be considered as unknown. Under this scenario, the local optimisation criterion of (5) may be modified to $$(x_{opt}, y_{opt}) = \arg\min_{(x_m, y_m)} \left\{ \sum_{k=1}^{K_m} \varphi^{(k,m)}(x_m, y_m) \right\}, \quad (6)$$

with $$\varphi^{(k,m)}(x_m, y_m) = L_p(2^{C/B} - 1). \quad (7)$$

In this way, by taking any knowledge available into account and ignoring (or replacing by an expected value) all unknown contributions, a near-optimal solution may be obtained.

When the plurality of wireless access nodes or base stations 105(1-N) are self-deploying, the distributed algorithm 110 may improve the deployment convergence speed by using the knowledge that for certain changes in a position of a wireless access node or base station, other wireless access nodes or base stations will react to those changes and take over users connected at an old position. Such self-deploying may result in a further movement of a desired wireless access node or base station in a next deployment step. This further movement may be taken into account in the current deployment step by moving further in the same direction, than the current optimum position indicates. Given that p={x, y} is a vector comprising the coordinates of the current position, and $p_{opt}$, the vector of the calculated optimum position, the new position $p_{new}$ for improved convergence may be calculated as $$p_{new} = p_{opt} + \alpha(p_{opt} - p), \quad (8)$$

where the path extension factor $\alpha$ is bounded in the interval $0 \leq \alpha \leq 1$ to achieve stability. However, for $\alpha = 1$ if the network environment does not change due to the re-positioning, at least some oscillating new positions $P_{new}$ may result. For $\alpha > 1$, at least some of the BS positions may become unstable.

Figure 6:
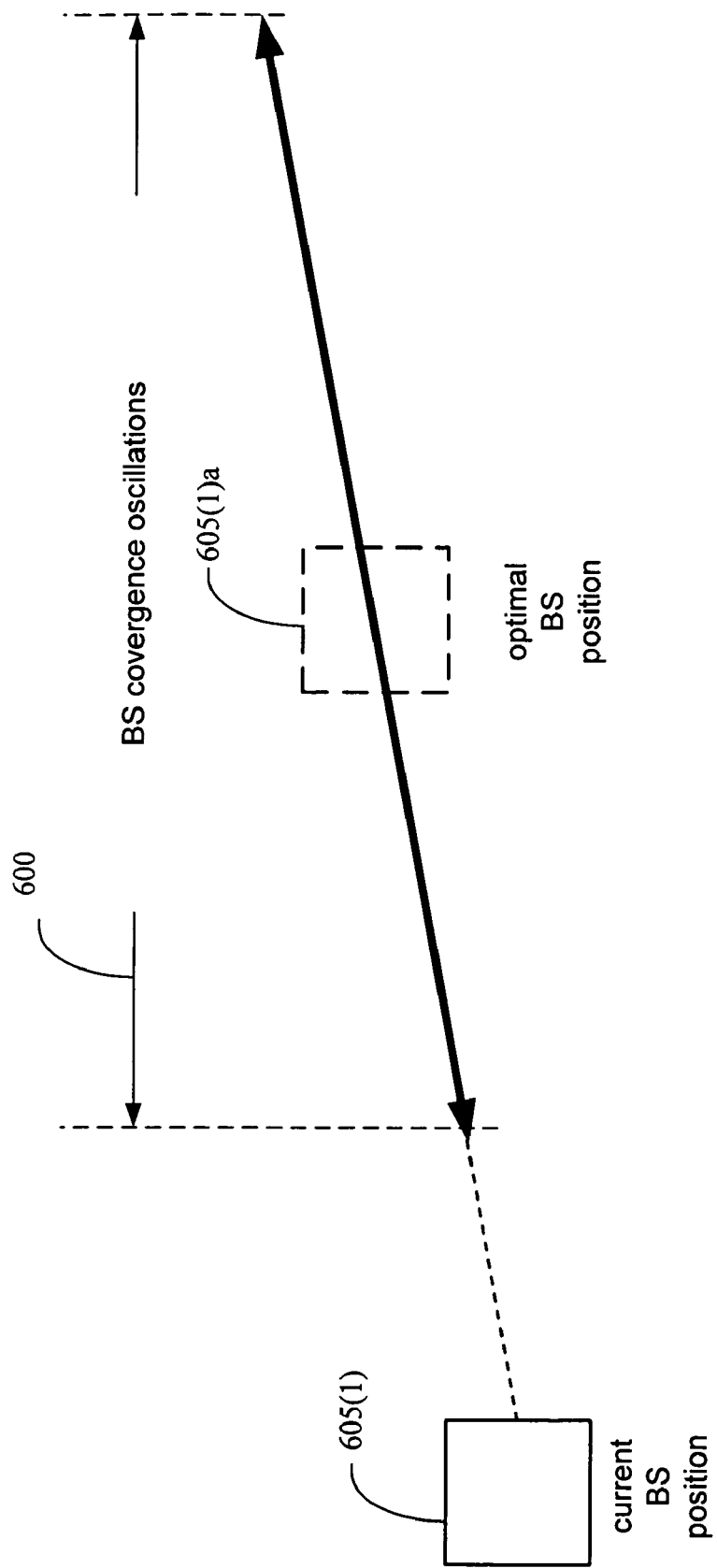
FIG. 6 schematically depicts oscillations around a calculated optimal position in one embodiment of improved convergence of a wireless access node or base station shown in FIG. 2 from a current position to an optimal position.

FIG. 6 schematically depicts oscillations 600 around a calculated optimal position in one embodiment of convergence of for the first BS 105(1) shown in FIG. 2 from a current position 605(1) to an optimal position 605a(1). The first BS 105(1) may be self-deployed at the calculated optimal position. By self-deploying the first BS 105(1), in response to a change in an old position of the first BS 105(1), the distributed algorithm 110 may cause the second BS 105(2) to take over one or more users connected to the first BS 105(1) at the old position, significantly increasing a rate of the deployment convergence.

An efficient deployment in channels dominated by shadow fading may be provided, in one embodiment. In a scenario where a path loss dominates the total channel loss, optimising a base station 105 position for the currently connected mobile units 120 may result in efficient self-deployment characteristics, since connection changes happen only at the edges of a cell. For scenarios where shadow fading dominates the channel loss for a single base station, the connections to the mobile units 120 may change dramatically when the base station 105 position changes. Therefore, optimizing the position for the currently connected mobiles may not be efficient in channels dominated by shadow fading.

However, by taking into account only one or more most probable connections to a base station of interest, at the current position, for unknown new shadow fading values, an optimization with respect to the mobile units 120, which are most likely to have a good connection to the base station 105 at its current position may be provided for different channel realisations. These mobile units 120 may form a new network environment for each base station 105, on which the self-deploying distributed algorithms 110 base associated positioning calculation. The mobile units 120 with the highest connection probability may be determined by a cell selection method (e.g., a mobile unit 120 connects to a base station with the strongest calculated received pilot power), while ignoring the shadow fading contribution in the calculation. In addition, any a priori information on the likelihood of channel changes may be taken into account.

However, each base station 105 of interest may not necessarily be aware of all the mobile units 120 with the highest connection probability, due to current poor channel conditions to some of these mobile units 120. Therefore, additional communication between the base stations 105 may result in exchange of position data of neighbouring mobile units 120 and base stations 105. However, for self-deployment based on known or expected user and demand distributions, this additional communication may not be used.

In one embodiment, for self-deployment with a highest connection probability based on strongest received pilot power cases each mobile unit 120 to connect to the base station 105 with the strongest received pilot power. The received pilot power $p_{n,m}$ from each base station 105 "n" at the mobile unit 120 "m" may be written as $$p_{n,m} = p_n + G_{BS} + G_{UE} - L = p_n + G_{BS} + G_{UE} - L_p - L_s, \quad (9)$$

where all entities are given in dB. The channel loss is denoted by L and comprises both, a path-loss component $L_p$ and a shadow fading component $L_s$. $G_{BS}$ and $G_{UE}$ represent the antenna gain including cable loss at the base station 105 and the mobile unit 120, respectively. The transmitted pilot power from the base station 105 "n" is denoted by $p_n$. Then, the mobile units 120 with the highest connection probability for unknown conditions may be obtained by ignoring the shadow fading component from the known current channel estimates for all mobile units 120. The resulting expected value of the received pilot power $\beta_{n,m}$ for unknown shadow fading values at any new position may then be written as $$\beta_{n,m} = p_n + G_{BS} + G_{UE} - L_p, \quad (10)$$

where $p_n$ is known at each base station 105, and the path-loss $L_p$ may be calculated using an implicit wall model with knowledge of the distance "d" to the mobile unit 120 of interest and the carrier wave-length $\lambda$. $G_{BS}$ and $G_{UE}$ are also known.

$$L_p = \underbrace{-20\log_{10}\left(\frac{\lambda}{4\pi}\right) + 20\log_{10}(d)}_{\text{propagation loss}} + \underbrace{10\log_{10}(d)}_{\text{walls}} \quad (11)$$

The loss through walls is dependent on the type of environment and may be derived based on the channel estimates.

In one embodiment, the connection data may be exchanged between the base stations 105 for the exchange of information of the mobile unit 120 locations in vicinity of each base station 105 of interest and their possible base station connections. Example of different methods of communication that may be used for such purposes include (a) a direct communication of neighbouring base stations 105 via a backhaul connection; (b) base stations 105 may update a centralised database containing all base station 105 positions and mobile unit 120 locations, which is accessible to all base stations 105 via the backhaul connection; (c) a direct communication of neighbouring base stations 105 via a radio link; and a relayed transmission of connection data via the mobile units 120, which may be seen by multiple base stations 105.

Figure 7:
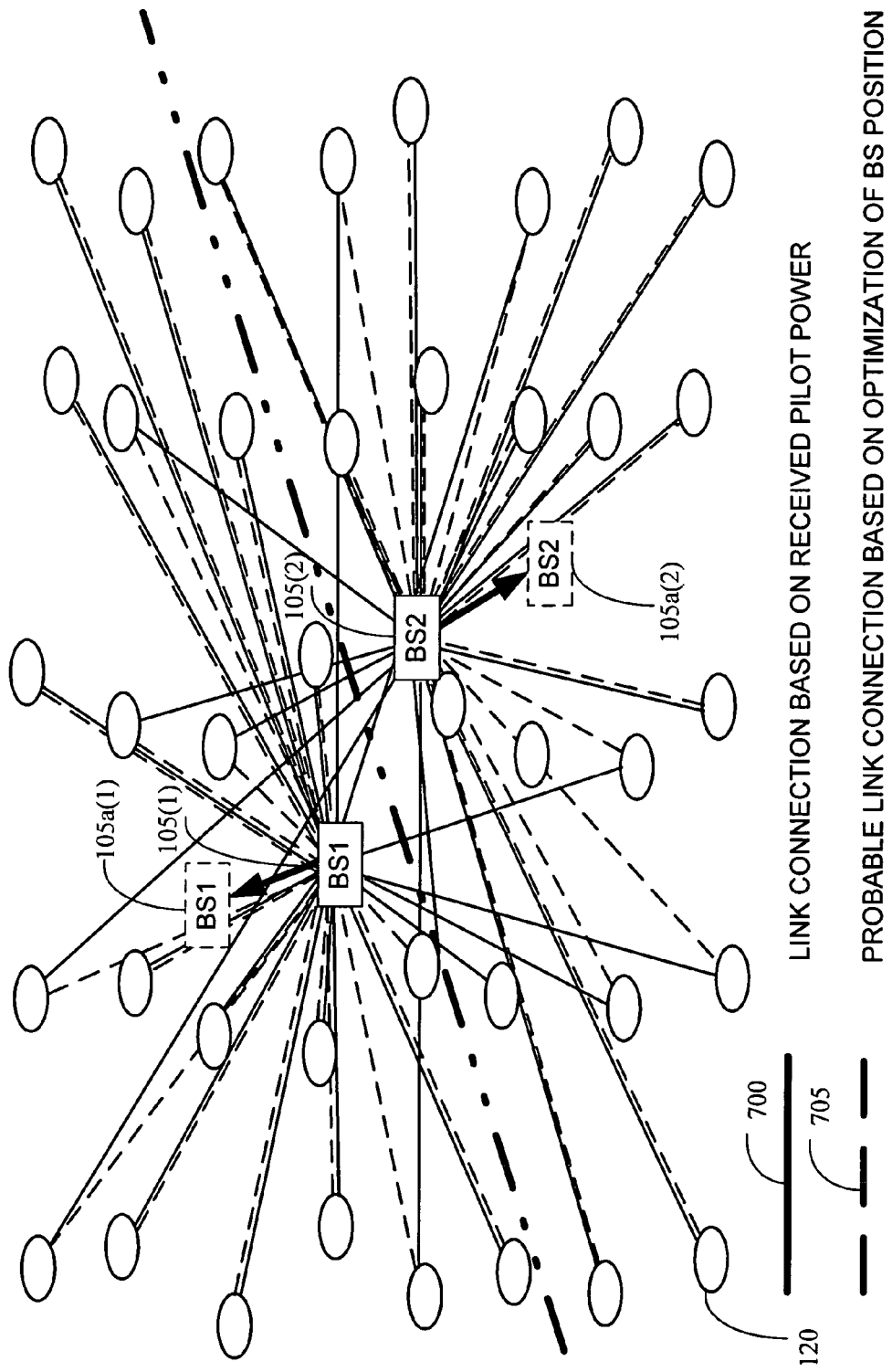
FIG. 7 schematically depicts one embodiment of an exemplary selection of wireless communication devices, e.g., mobile units for optimization of the wireless access node or base station position.

Referring to FIG. 7, one embodiment of an exemplary selection of wireless communication devices or mobile units is schematically depicted for optimization of a wireless access node or a base station position, such as the first BS 105(1) position shown in FIG. 6. An example of one step of the self-deployment process based on a new network environment (e.g., highest connection probability of the wireless communication devices or mobile units 120(1-*m*)) is illustrated in FIG. 7.

Again the current positions of the first and second BSs, BS1 and BS2 are shown as solid squares and the wireless communication devices or mobile units 120 are shown as ellipses with a line to a connected base station for a link connection 700 based on received pilot power. The wireless communication devices or mobile units 120 with the highest connection probability for different channel conditions are indicated via dashed lines to the corresponding base station, as probable link connection 705 based on optimization of BS position. For instance, the new or optimal base station positions of the first and second BSs, BS1 and BS2 are shown as dotted squares. The new or optimal base station positions may trigger a change in both, the link connection to the wireless communication devices or mobile units 120, and the network environment (e.g., most probable link connections 705 for different shadow fading values). In one embodiment, the BS positioning is independent of the current link connections 145 to the wireless communication devices or mobile units 120.

Figure 8:
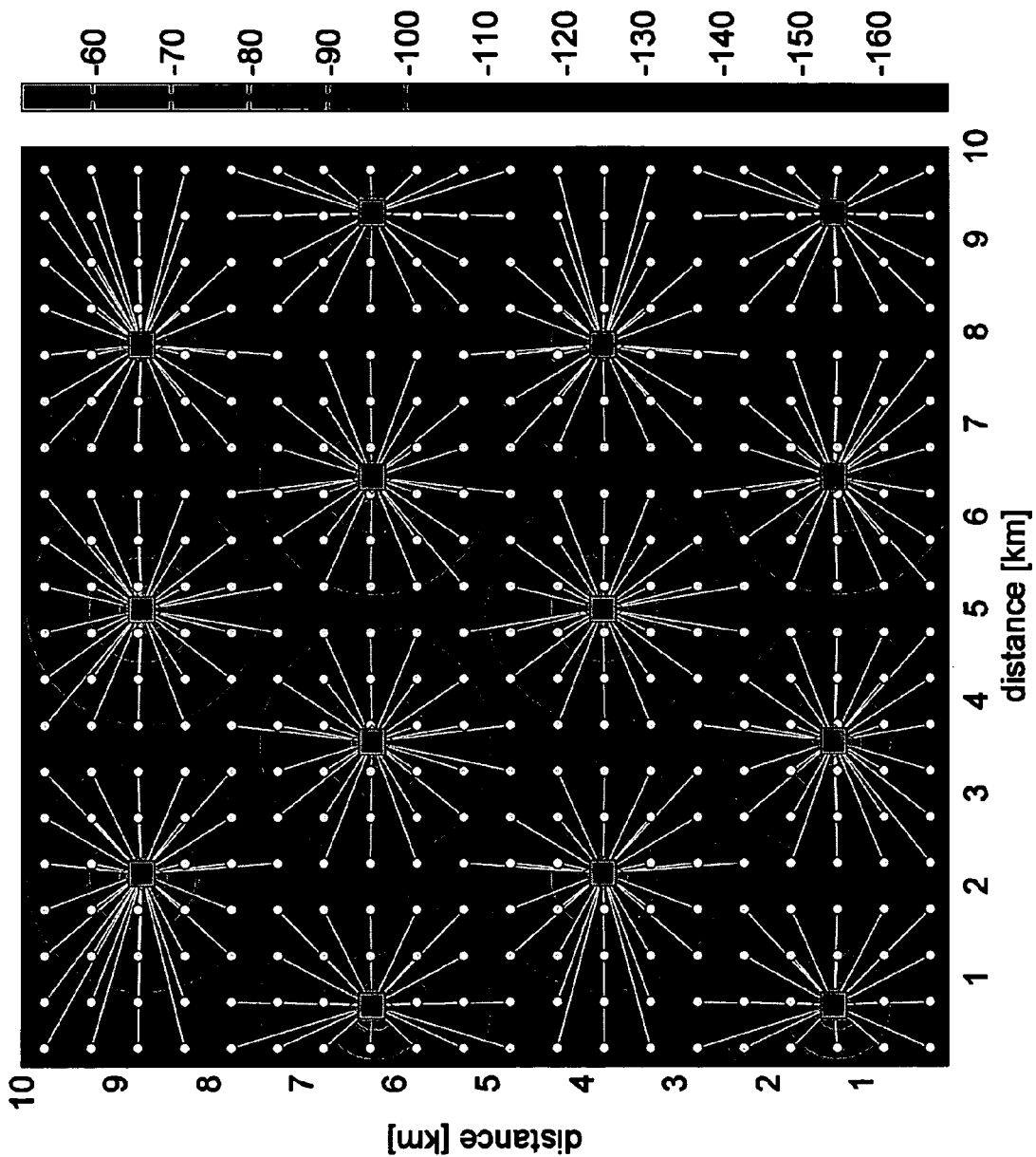
FIG. 8 schematically depicts one embodiment of link connections for the wireless communication devices, e.g., mobile units to the wireless access nodes or base stations for the wireless access network shown in FIG. 1.
Figure 9:
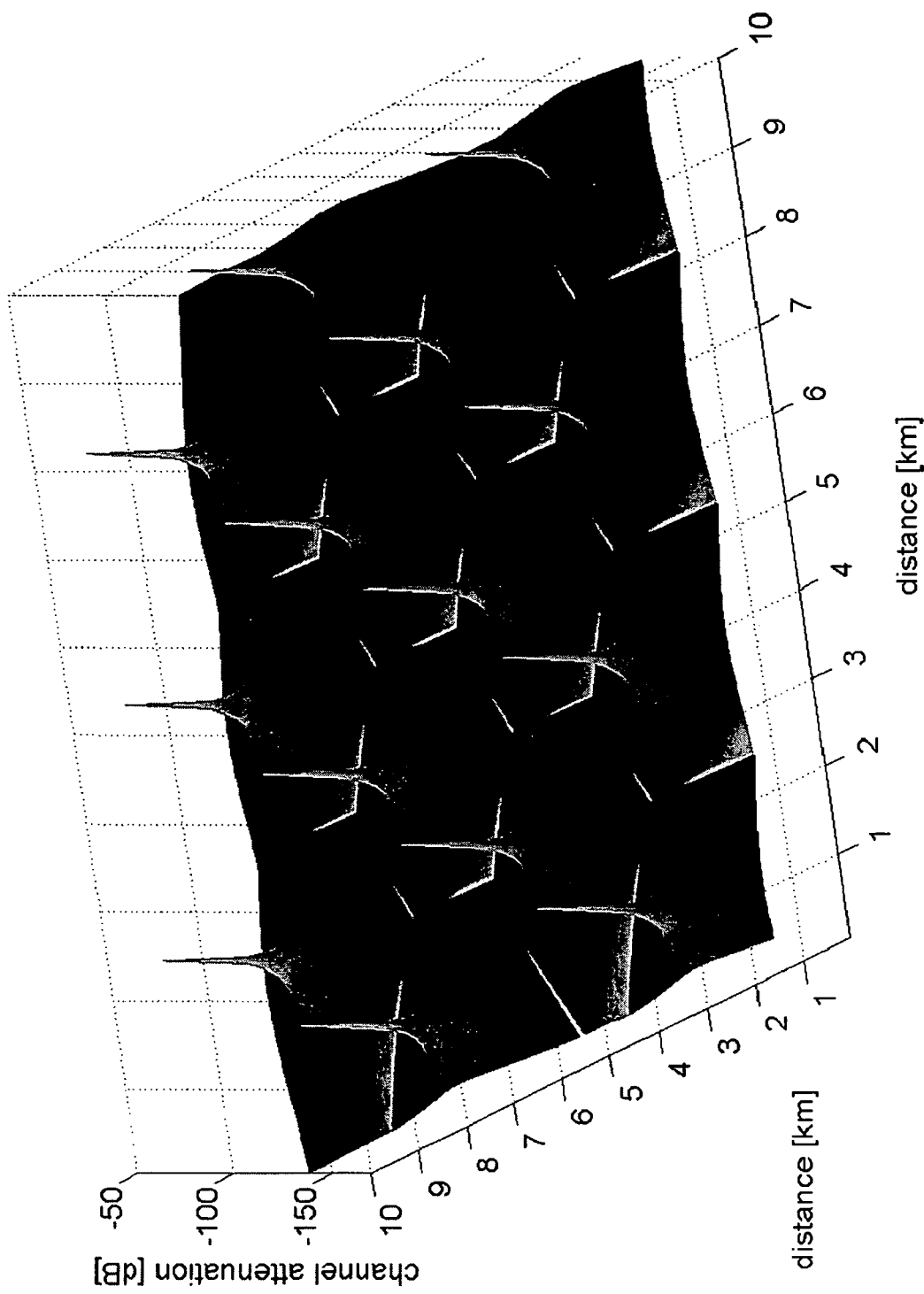
FIG. 9 schematically depicts one embodiment of channel attenuations for constant wireless access node or base station positions in the wireless access network shown in FIG. 1.

Turning now to FIG. 8, a chart schematically depicts one embodiment the link connections 700 for the wireless communication devices or mobile units 120 to the wireless access nodes or base stations 105 for the wireless access communication network 115 shown in FIG. 1. Likewise, in FIG. 9, a chart schematically depicts one embodiment of channel attenuations for constant wireless access node or base station 105 positions in the wireless access communication network 115.

Figure 10:
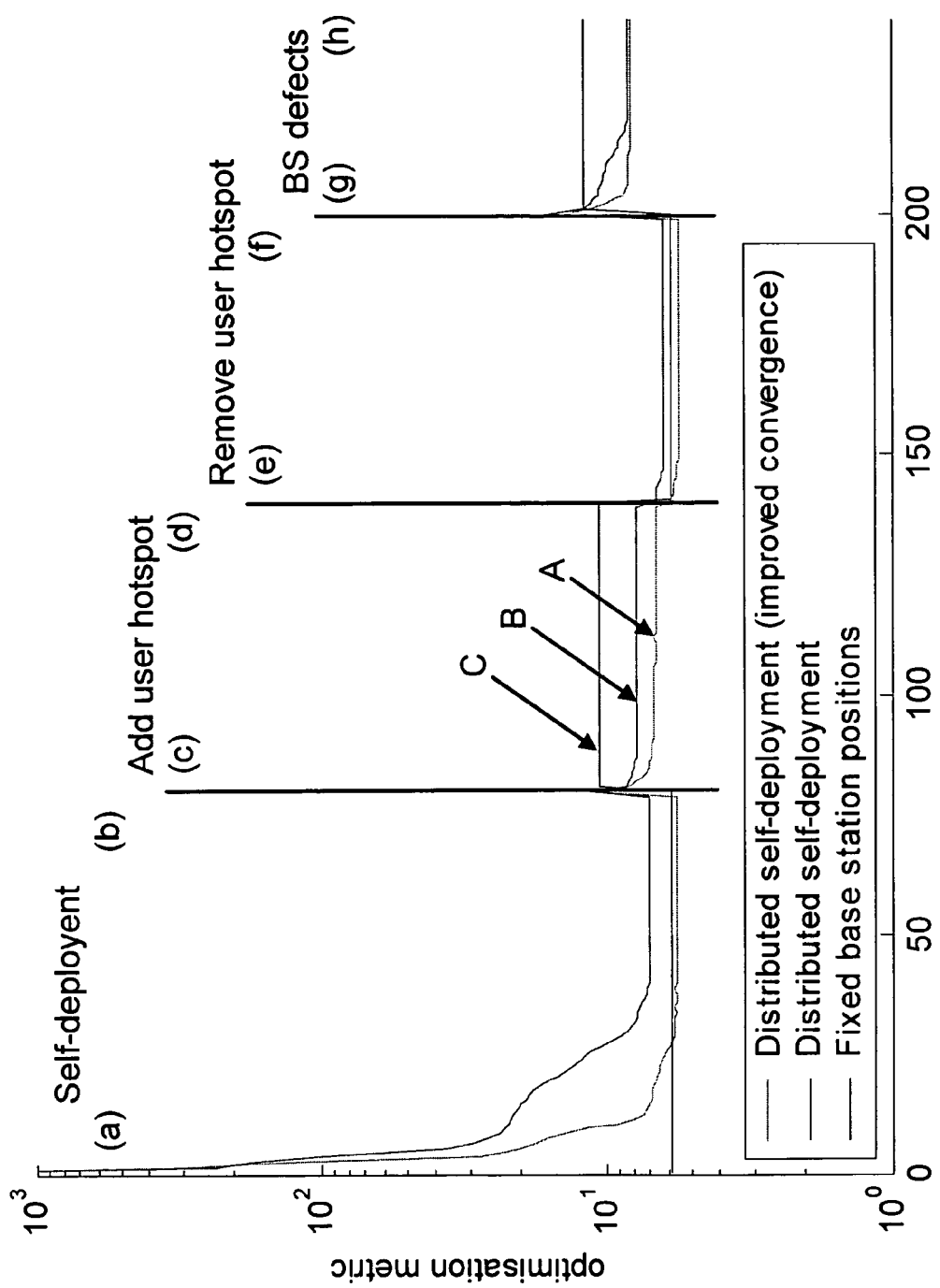
FIG. 10 schematically depicts performance comparison for convergence based on the self-deployment using the distributed algorithm shown in FIG. 1 according to one illustrative embodiment of the present invention.

Referring to FIG. 10, a chart schematically depicts performance comparison for convergence based on the self-deployment using the distributed algorithm 110 shown in FIG. 1 according to one illustrative embodiment of the present invention. Without load balancing, use of the distribution algorithm 110 is compared with both, a reference network with fixed base station positions shown in FIGS. 8 and 9, and a self-deploying network set forth above. The chart in FIG. 10 shows that the distribution algorithm 110 (with α=0.95) may result in a significant reduction in deployment time, and relatively better overall network performance.

Figure 11:
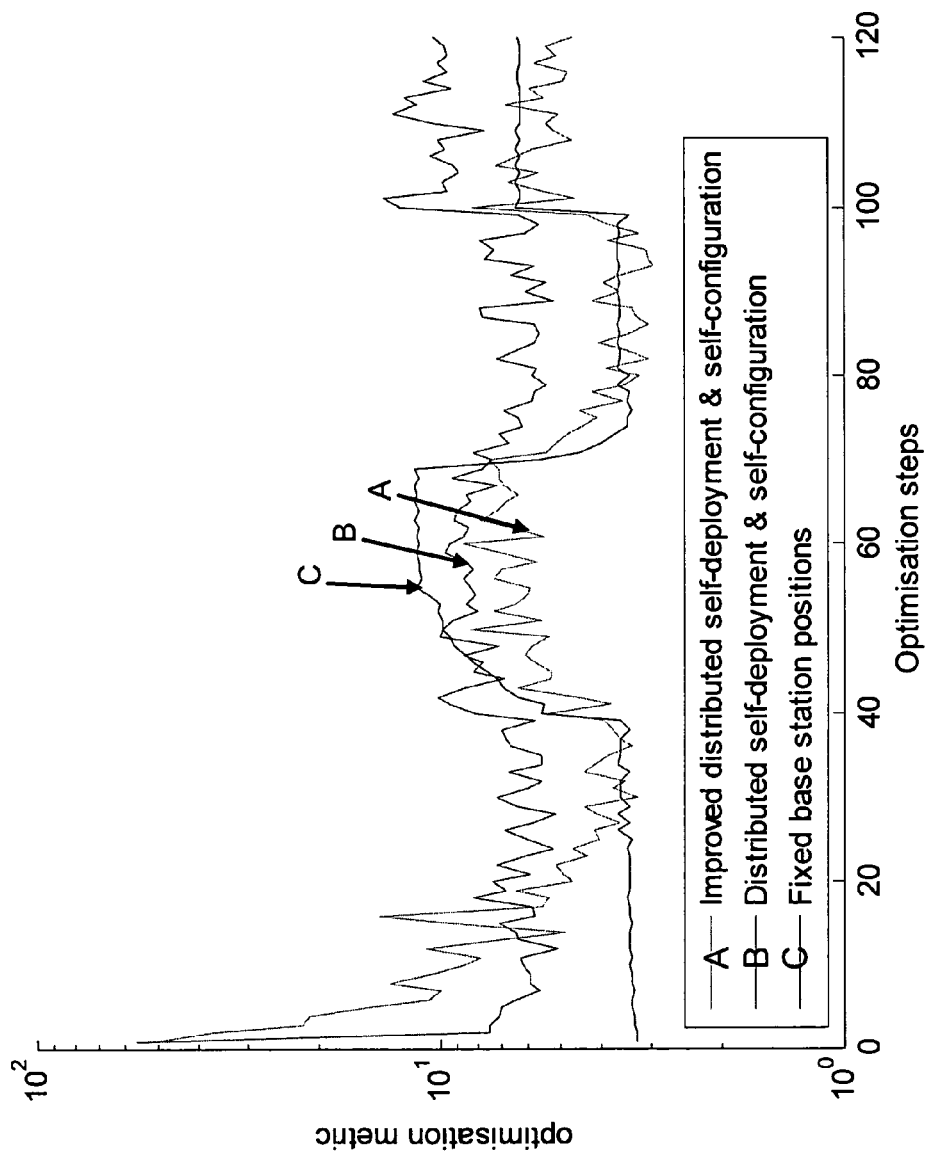
FIG. 11 schematically depicts performance comparison for self-deployment in channels with dominating shadow fading using the distributed algorithm shown in FIG. 1 in accordance with one illustrative embodiment of the present invention.

Finally, FIG. 11 schematically depicts a chart showing performance comparison for self-deployment in channels with dominating shadow fading using the distributed algorithm 110 shown in FIG. 11 in accordance with one illustrative embodiment of the present invention. The chart of FIG. 11 shows that the reference network shown in FIGS. 8 and 9 with constant base station positions performs well for uniform user distributions. The optimization based on the distributed algorithm 110 performs well for uniform user distributions after the deployment stage and significantly outperforms both, a simpler optimization method and the reference network with fixed base station positions, for non-uniform user distributions and for a case of failing base stations.

The chart of FIG. 11 shows that self-deployment based on the current connections may outperform the reference network only for non-uniform user distributions. The optimization based on the distributed algorithm 110 performs well for uniform user distributions after the deployment stage and significantly outperforms the other methods, for non-uniform user distributions and for the case of failing base stations.

For autonomous self-deployment, and self-configuration of base station 105 position and/or radiation patterns, the distributed algorithm 110 based on the channel capacity may take the current values of the environment (channels), user locations and the user demand (current values or statistics) into account. Using incomplete local system knowledge of the communications system 100 shown in FIG. 1, the distributed algorithm 110 may derive a near-optimal global solution to provide the base station 105 positioning and configuration. Moreover, the distributed algorithm 110 may improve upon a convergence time of self-deploying networks. To significantly improve the self-deployment performance in environments where shadow fading is dominating the channel loss, the distributed algorithm 110 may select local system information for the optimization of base station 105 positions.

In other embodiments, the distributed algorithm 110 may reduces costs of deployment since the wireless access communication network 115 may provide information on optimized positions and/or radiation patterns for each base station 105 based on associated measurements, obviating drive testing. With mobile base stations 105, the distributed algorithm 110 may enable network optimization based on current values of user demand and user locations. The wireless access communication network 115 may adapt efficiently to changes in user demand and user locations, resulting in an improved performance of the self-deploying and self-configuring network for changing user demand and user distributions.

In some embodiments, the distributed algorithm 110 may enable a long-term optimization of deployed networks based on measured statistics 122(3). The resulting information may be used to identify the need for a new base station 105 and modification of the current positions or radiation patterns. Due to the distributed processing, the distributed algorithm 110 may provide a scalable and robust wireless access communication network 115 against failing wireless access nodes or base stations 105. The distributed algorithm 110 may operate efficiently with limited local system knowledge using a long-term and short-term optimization of deployed networks based on measured statistics 122(3). In this manner, use of indirect communication (stigmergy) may provide a universal language and enable communication and interoperability of heterogeneous systems, obviating a need to know different standards to communicate within the wireless access communication network 115.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for adapting a self-deploying communications network of a plurality of mobile base stations to a changing environment, the method comprising:
    determining a current location of at least a first user in said self-deploying communications network;
    identifying a need for change in at least one position of at least one first mobile base station of said plurality of mobile base stations based on said current location of said first user, said at least one first mobile base stations being capable of implementing said change in said at least one position without human intervention; and
    in response to said need for change for said first mobile base station, implementing a first response in said self-deploying communications network.

2. A method, as set forth in claim 1, further comprises:
    determining a current location of a second user in said self-deploying communications network;
    determining distribution of said first and second users across a coverage area of said self-deploying communications network based on said current locations of said first and second users;
    determining demand for use from said first and second users for said self-deploying communications network;
    determining a desired change in said position of said first mobile base station based on said at least one of distribution and demand; and
    coordinating said first response to said need for change for said first mobile base station with a second response to said need for change for at least one neighboring mobile base station.

3. A method, as set forth in claim 2, further comprises:
    autonomously identifying a desired change in number and configuration of said plurality of mobile base stations based on said demand and said current locations of said first and second users;
    in response to said desired change, self-deploying said self-deploying communications network in a distributed manner that adapts said self-deploying communications network to said changing environment; and
    positioning each mobile base station of said plurality of mobile base stations, respectively, to enable said self-deploying communications network to sustain all requested links with a given minimum use of a resource of said plurality of mobile base stations.

4. A method, as set forth in claim 3, wherein positioning each mobile base station further comprises:
    positioning a first and a second mobile base station to minimize at least one of the total transmitted power for said all requested links and to minimize use of the available frequency spectrum to optimize said self-deploying communications network; and
    causing each of said first and second base mobile stations to self-configure for autonomously self-deploying said self-deploying communications network.

5. A method, as set forth in claim 3, further comprises:
    collecting one or more user statistics at each mobile base station of said plurality of mobile base stations during operation thereof; and
    determining an optimum position for at least one mobile base station of said plurality of mobile base stations capable of modifying said current location thereof without human intervention to optimize based on said collected user statistics.

6. A method, as set forth in claim 3, further comprises:
    in response to a change in at least one of said current location of said first user and a demand for transmit power and available frequency spectrum from said first user, enabling said self-deploying communications network to adapt autonomously; and
    indirectly communicating between each of said plurality of mobile base stations to obtain a globally self-organizing behavior thereof in said self-deploying communications network.

7. A method, as set forth in claim 3, wherein identifying a need for change further comprises:
    autonomously identifying a desired globally or locally optimal radiation pattern for each of said plurality of mobile base stations based on said change in at least one of said current location of said first user and a demand for transmit power and available frequency spectrum from said first user in said self-deploying communications network;
    in response to said desired globally or locally optimal radiation pattern, self-deploying said self-deploying communications network in a distributed manner that adapts said self-deploying communications network to said changing environment; and searching for a solution for self-deployment and self-configuration to obtain said desired globally or locally optimal radiation pattern based on a first parameter indicative of knowledge of how each of said plurality of mobile base stations modify an associated surrounding environment, and a second parameter indicative of how a change in said associated surrounding environment influences a behavior of one or more neighboring mobile base stations.

8. A method, as set forth in claim 2, wherein determining distribution of said first and second users across a coverage area of said self-deploying communications network further comprises:

deriving said distribution of said first and second users from said current locations of said first and second users over a period of time.

9. A method, as set forth in claim 2, further comprises:

self-deploying a first mobile base station and a second mobile base station; and in response to a change in a old position of said first mobile base station, causing said second mobile base station to take over one or more users connected to said first mobile base station at the old position to increase a rate of the deployment convergence and move said first mobile base station in direction of a calculated optimal position to further increase the rate of the deployment convergence.

10. A method, as set forth in claim 9, further comprises:

calculating a metric indicative of received pilot power from each of said first and second mobile base stations at a wireless communication device; and connecting said wireless communication device to one of said first and second mobile base stations based on said metric indicative of strongest received pilot power among said first and second mobile base stations.

11. A method, as set forth in claim 1, further comprises:

determining wireless access node coordinates for at least one of a first and a second mobile base stations of said plurality of mobile base stations;

determining user coordinates for at least one of desired first and second wireless communication devices;

estimating a channel loss to said at least one of desired first and second wireless communication devices based on said wireless access node and user coordinates; and determining a request for capacity for said at least one of desired first and second wireless communication devices.

12. A method, as set forth in claim 11, further comprises:

collecting at least one of statistics over a period of time and position data associated with said first mobile base station;

providing said at least one of statistics over a period of time and position data of said first mobile base station to said at least one of desired first and second wireless communication devices;

causing a change in a position of said first mobile base station based on a location and a requested data rate of said at least one of desired first and second wireless communication devices;

modifying the distance of said at least one of desired first and second wireless communication devices to said first mobile base station and said requested data rate to move said first mobile base station to a predicted position based on the modified distance and the modified requested data rate; and performing a search for a desired position of said first mobile base station based on said predicted position.

13. A method, as set forth in claim 12, wherein performing a search for a desired position of said first mobile base station further comprises:

moving said first mobile base station in direction of a calculated optimal position.

14. A method, as set forth in claim 11, further comprises:

collecting at least one of statistics over a period of time and position data associated with said first mobile base station;

providing said at least one of statistics over a period of time and position data of said first mobile base station to said at least one of desired first and second wireless communication devices;

causing a change in a position of said first mobile base station based on a location and a requested data rate of said at least one of desired first and second wireless communication devices;

modifying the distance of said at least one of desired first and second wireless communication devices to said first mobile base station and said requested data rate to move said first mobile base station to a predicted position based on the modified distance and the modified requested data rate; and performing a search for a desired radiation pattern of said first mobile base station based on said predicted position.

15. A method, as set forth in claim 14, wherein performing a search for a desired position of said first mobile base station further comprises:

updating a radiation pattern of said first mobile base station.

16. A wireless access node associated with a self-deploying communications network comprises:

a controller capable of adapting said self-deploying communications network to a changing environment; and a storage coupled to said controller, said storage storing instructions to determine a current location of at least a first user in said self-deploying communications network, identify a need for changing in at least one posititon of said wireless access node based on said current location of said first user, said wireless access node being capable of changing said at least one position without human invention, and implement a first response in said self-deploying communications network in response to said need for change in said at least one position of said wireless access node.

17. A wireless access node, as set forth in claim 16, wherein said wireless access node is a mobile base station and said self-deploying communications network is a wireless access communication network.

18. A communications system comprising:

a wireless access node associated with a self-deploying communications network, said wireless access node including:

a controller capable of adapting said self-deploying communications network to a changing environment; and a storage coupled to said controller, said storage storing instructions to determine a current location of at least a first user in said self-deploying communications network, identify a need for change in at least one a position of said wireless access node based on said current location of said first user, said wireless access node being capable of changing said at least one position without human intervention, and implement a first response in said self-deploying communications network in response to said need for change for said wireless access node.

19. A communications system, as set forth in claim 18, wherein said self-deploying communications network is being defined at least in part by a Universal Mobile Telecommunication System (UMTS) protocol.

20. An article comprising a computer readable storage medium storing instructions that, when executed cause a communications system to:
- determine a current location of at least a first user in a communications network to adapt said self-deploying communications network of a plurality of mobile base stations to a changing environment;
- identify a need for change in at least one position of a first mobile base station of said plurality of mobile base stations based on said current location of said first user, said first mobile base station being capable of implementing the change in said at least one position without human intervention; and
- implement a first response in said self-deploying communications network in response to said need for change for said first mobile base station.

* * * * *